United States Patent
Collins et al.

(10) Patent No.: US 12,436,912 B2
(45) Date of Patent: Oct. 7, 2025

(54) DISAGGREGATED DIE WITH INPUT/OUTPUT (I/O) TILES

(71) Applicant: Intel Corporation, Santa Clara, CA (US)

(72) Inventors: Andrew Paul Collins, Chandler, AZ (US); Mahesh Krishnappayya Kumashikar, Bangalore (IN); Srikanth Nimmagadda, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/613,256

(22) Filed: Mar. 22, 2024

(65) Prior Publication Data

US 2024/0232122 A1      Jul. 11, 2024

Related U.S. Application Data

(63) Continuation of application No. 16/799,192, filed on Feb. 24, 2020, now abandoned.

(51) Int. Cl.
*G06F 13/42*     (2006.01)
*G06F 9/38*      (2018.01)
*G06F 13/40*     (2006.01)

(52) U.S. Cl.
CPC ........ *G06F 13/4221* (2013.01); *G06F 9/3822* (2013.01); *G06F 9/3869* (2013.01); *G06F 9/3877* (2013.01); *G06F 13/4027* (2013.01)

(58) Field of Classification Search
None
See application file for complete search history.

(56) References Cited

U.S. PATENT DOCUMENTS

| | | | |
|---|---|---|---|
| 10,394,737 B1 * | 8/2019 | Ngo | G06F 5/065 |
| 2008/0288683 A1 | 11/2008 | Ramey | |
| 2013/0015590 A1 * | 1/2013 | Haba | G11C 5/04 257/778 |

* cited by examiner

*Primary Examiner* — Tim T Vo
*Assistant Examiner* — Dayton Lewis-Taylor
(74) *Attorney, Agent, or Firm* — Akona IP PC

(57) ABSTRACT

Embodiments may relate to a microelectronic assembly including a substrate; a first die electrically coupled to the substrate, wherein the first die includes a first edge, a second edge, a third edge opposite the first edge, and a fourth edge opposite the second edge; and a second die electrically coupled to the substrate adjacent to the second edge of the first die and communicatively coupled to the first die, wherein the second die includes a fifth edge and a sixth edge opposite the fifth edge, and wherein the fifth edge of the second die is substantially aligned with the first edge of the first die and the sixth edge of the second die extends beyond the third edge of the first die, where the first die includes a processor die and the second die includes an input/output (I/O) die.

13 Claims, 11 Drawing Sheets

DISAGGREGATED DIE WITH INPUT/OUTPUT (I/O) TILES

CROSS-REFERENCE TO RELATED APPLICATION

This application is a continuation of (and claims the benefit and priority under 35 U.S.C. 120 of) U.S. patent application Ser. No. 16/799,192, filed Feb. 24, 2020, entitled "DISAGGREGATED DIE WITH INPUT/OUTPUT (I/O) TILES," the disclosure of which is considered part of, and is incorporated by reference in, the disclosure of this application.

BACKGROUND

Typically, in legacy dies, die size may be based on the area required to support the core logic. A die that is subject to this limitation may be referred to a core-limited die. Alternatively, die size may be based on the die perimeter necessary to support breakout of the input/output (I/O) of the die. A die that is subject to this limitation may be referred to as an I/O-limited die. In legacy dies, the die size may generally be based on the larger of the die size that results from a core-limitation or an I/O-limitation.

However, I/O-limited die may have an increased area because of the I/O of the die. This increased area may result in underutilized transistor area at or near the region of the core logic. This increase in die size may negatively impact the number of dies that may be manufactured per wafer, and may also significantly increase the cost of products that use the resultant die.

DETAILED DESCRIPTION

Figure 1:
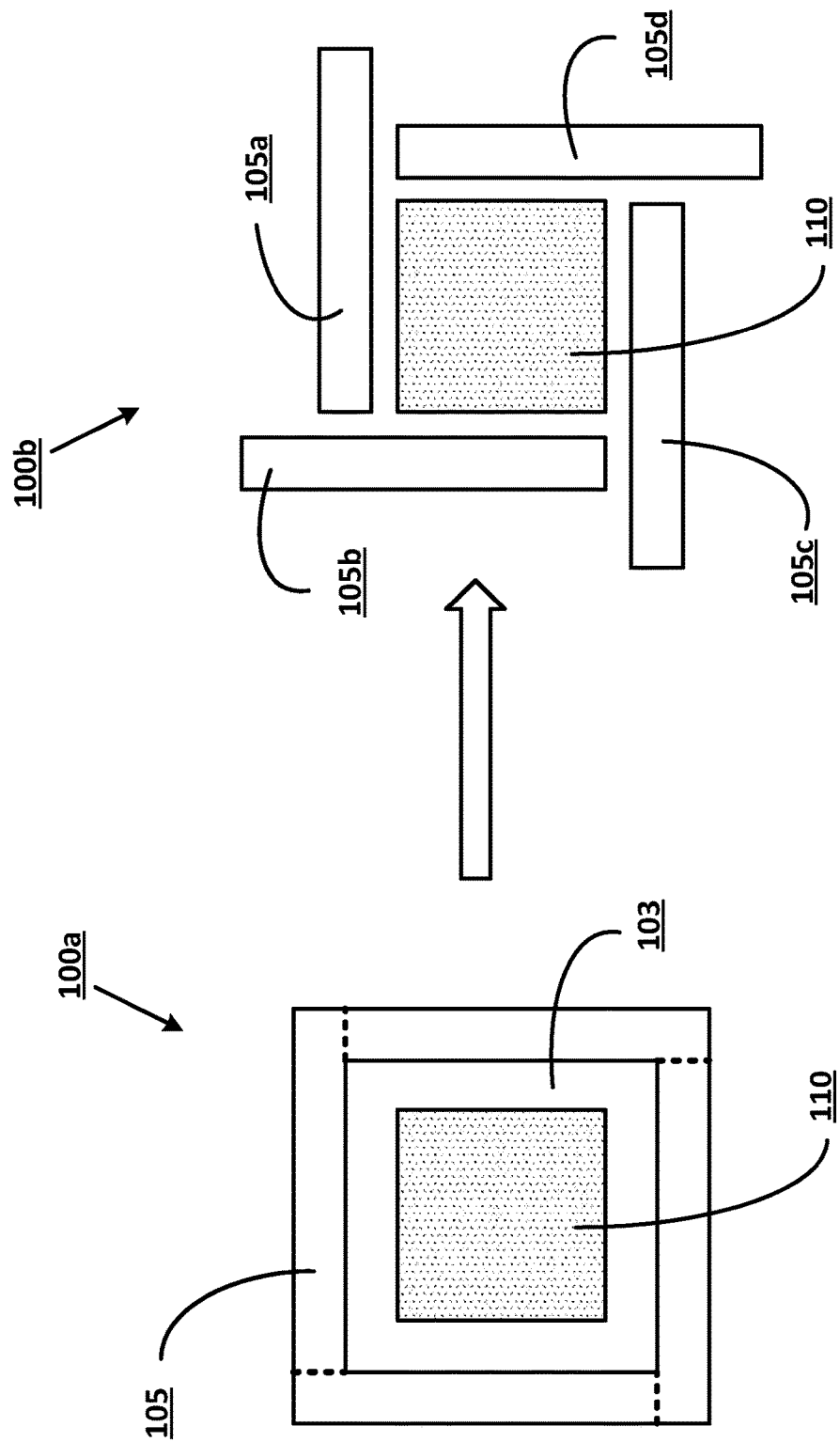
FIG. 1 depicts an example of a die configuration with a plurality of I/O tiles, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature on a second feature," may mean that the first feature is formed/deposited/disposed/etc. over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

As noted above, legacy die sizes may typically be referred to as core-limited or I/O-limited. However, I/O-limited die may have an increased die area because of the I/O of the die, which may result in underutilized transistor area at or near the region of the core logic. New silicon processes typically enable aggressive scaling for core area but I/O scaling typically does not scale at the same rate. This relationship can create problems for keeping a good balance of core-limited or I/O-limited die size optimization.

Embodiments herein relate to the use of die disaggregation techniques to decouple the core die area from the I/O perimeter requirement by creating a die complex where the I/O may extend beyond the footprint of the main die. Specifically, the die perimeter utilized for I/O escape may not be constrained by a rectangular shape. In some embodiments, this disaggregation technique may include the use of a bridge such as an embedded multi-die interconnect bridge (EMIB) a silicon interposer, an integrated fan-out on a substrate, or with a memory on the substrate, etc. to create or enable the offset I/O tile die complex. It will be understood these are examples of such bridges, and other types or kinds of bridges may be used in other embodiments.

Embodiments may provide a number of advantages. For example, the offset I/O tile concept may enable active die area reduction for die complexes that would otherwise be I/O-limited in legacy configurations. By disaggregating the I/O on a die, the I/O tile may be instanced multiple times and utilized across multiple programs. The offset tile configuration may further decouple the I/O tile perimeter requirement from the perimeter available on the main die, which may extend the ability to reuse that tile across different die complexes.

FIG. 1 depicts an example of a die configuration with a plurality of I/O tiles, in accordance with various embodiments. Specifically, FIG. 1 depicts a die configuration 100*a* which may be similar to a legacy configuration. Specifically, an I/O structure 105 may generally surround a processor 110. In various embodiments, the processor 110 may be a stand-alone processor, a central processing unit (CPU), a general processing unit (GPU), a core of a single or multi-core processor, a logic circuit, or some other type of processor. The I/O structure 105 may be communicatively coupled with the processor 110 by one or more physical or electronic couplings (not shown) such as a bridge, an interposer, etc. Generally, the I/O structure 105 and the processor 110 may be considered elements of a single die. However, as may be seen, the I/O structure 105 may be significantly larger than the processor 110 because it may be desirable for the I/O structure 105 to include additional input or output pins or ports, which may dictate the size of the I/O structure 105. The discrepancy in sizes between the processor 110 and the I/O structure 105 may result in underutilized area 103 between the I/O structure 105 and the processor 110 as described above.

However, the I/O structure 105 may be separated into a plurality of I/O tiles and rearranged to form a disaggregated die complex as shown in die configuration 100*b*. Specifically, the I/O structure 105 may be split along the dashed lines to form four I/O tiles 105*a*, 105*b*, 105*c*, and 105*d* (collectively referred to herein as "I/O tiles 105*a*-105*d*"). The I/O tiles 105*a*-105*d* may be rearranged around the processor 110 as shown in die configuration 100*b*. It will be noted that although the I/O tiles 105*a*-105*d* may have the same total I/O breakout area as the I/O structure 105, the underutilized area 103 may be eliminated in the die configuration 100*b*. As such, the die configuration 100*b* may be viewed as more compact and take up less overall space than the die configuration 100*a*, which may provide more space for the addition or inclusion of other elements that would otherwise be prohibited by the presence of the underutilized area 103.

Figure 2:
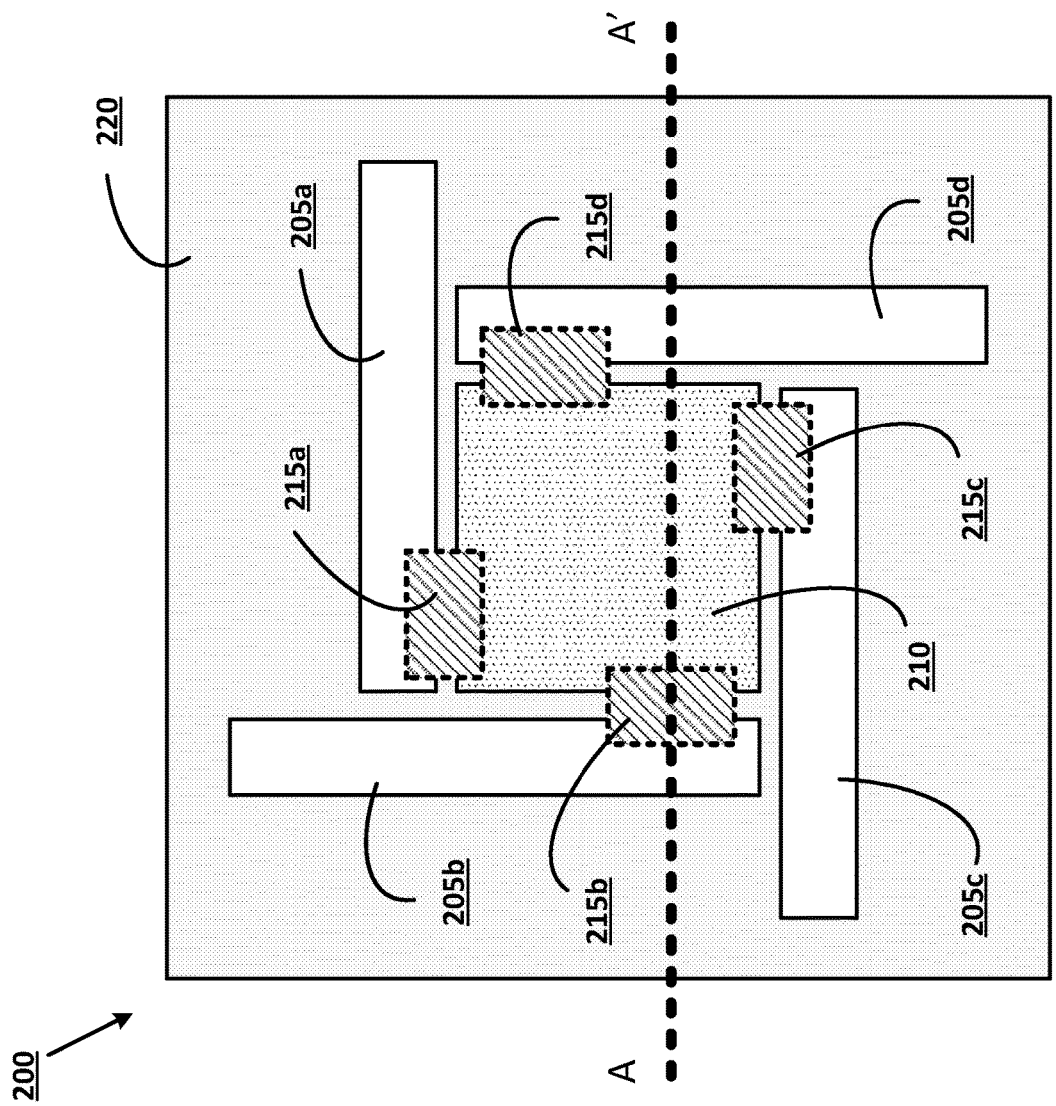
FIG. 2 depicts a top-down view of an example die with a plurality of I/O tiles, in accordance with various embodiments.

FIG. 2 depicts a top-down view of an example die 200 with a plurality of I/O tiles, in accordance with various embodiments. The die 200 may include a processor 210, which may be similar to, and share one or more characteristics with, processor 110. The die 200 may further include a number of I/O tiles 205*a*/205*b*/205*c*/205*d* (collectively referred to herein as "I/O tiles 205*a*-205*d*") which may be similar to, and share one or more characteristics with, I/O tiles 105*a*-105*d*.

The I/O tiles 205*a*-205*d* may be implemented as separate physical elements such as a chip or a tile on the die 200. Specifically, the die 200 may include a substrate 220 which may be formed of a substrate material such as an organic or inorganic material, a silicon or silicon-including material, or some other type of substrate material. The substrate 220 may include one or more layers of substrate material and may be cored or coreless. In some embodiments, the substrate 220 may include one or more conductive elements such as traces, striplines, microstrips, vias, pads, etc. which may enable, facilitate, or otherwise be part of an electrical or communicative pathway between two elements of the die 200 or of an element of the die 200 and another element of an electronic device of which the die 200 is a part. In some embodiments, the substrate 220 may be considered to be a passive interposer, an active interposer, or some other type of substrate or element.

The processor 210 and the I/O tiles 205*a*-205*d* may be coupled with the substrate 220, for example by solder bumps, pins, or some other type of interconnect element. The substrate 220 may further include one or more bridges 215*a*/215*b*/215*c*/215*d* (collectively referred to herein as "bridges 215*a*-215*d*"). In some embodiments, one or more of the bridges 215*a*-215*d* may be a bridge such as an active or passive EMIB. Additionally or alternatively, one or more of the bridges 215*a*-215*d* may be a silicon bridge, a conductive trace such as a trace, a microstrip, or a stripline, an integrated fan-out on the substrate 220, a fan-out with a memory on the substrate 220, or some other type of bridge.

Figure 3:
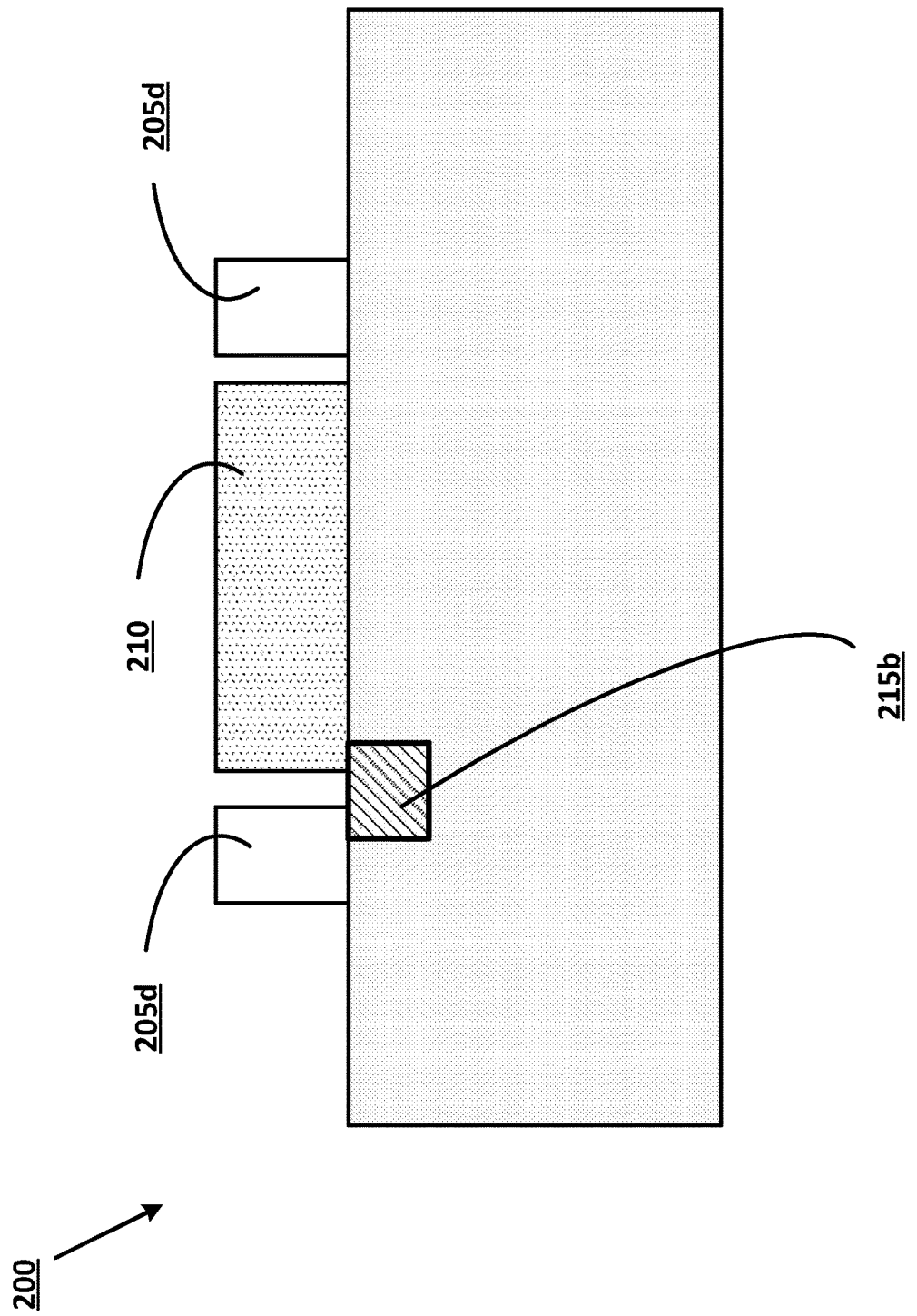
FIG. 3 depicts a cutaway view of the example die of FIG. 2, in accordance with various embodiments.

FIG. 3 depicts a cutaway view of the example die 200 of FIG. 2, in accordance with various embodiments. Specifically, FIG. 3 depicts a cutaway view along line A-A' of the die 200 of FIG. 2. As may be seen, one or more of the bridges 215*a*-215*d* may be embedded within the substrate 220 as shown in FIG. 3 with respect to bridge 215*b*. In other embodiments one or more of the bridges 215*a*-215*d* may be coupled to a same face of the substrate 220, may only be partially embedded within the substrate 220, may be embedded at a deeper layer of the substrate 220 and coupled with the processor 210 or an I/O tile by one or more vias, etc.

As may be seen in FIGS. 2 and 3, the processor 210 and the I/O tiles 205a-205d may overlap one or more of the bridges 215a-215d. This overlap may be because the bridges 215a-215d may communicatively couple the processor 210 to the I/O tiles 205a-205d. As such, signals to or from the processor 210 may pass through the I/O tiles 205a-205d and the bridges 215a-215d, thereby allowing I/O breakout on the die 200.

Figure 4:
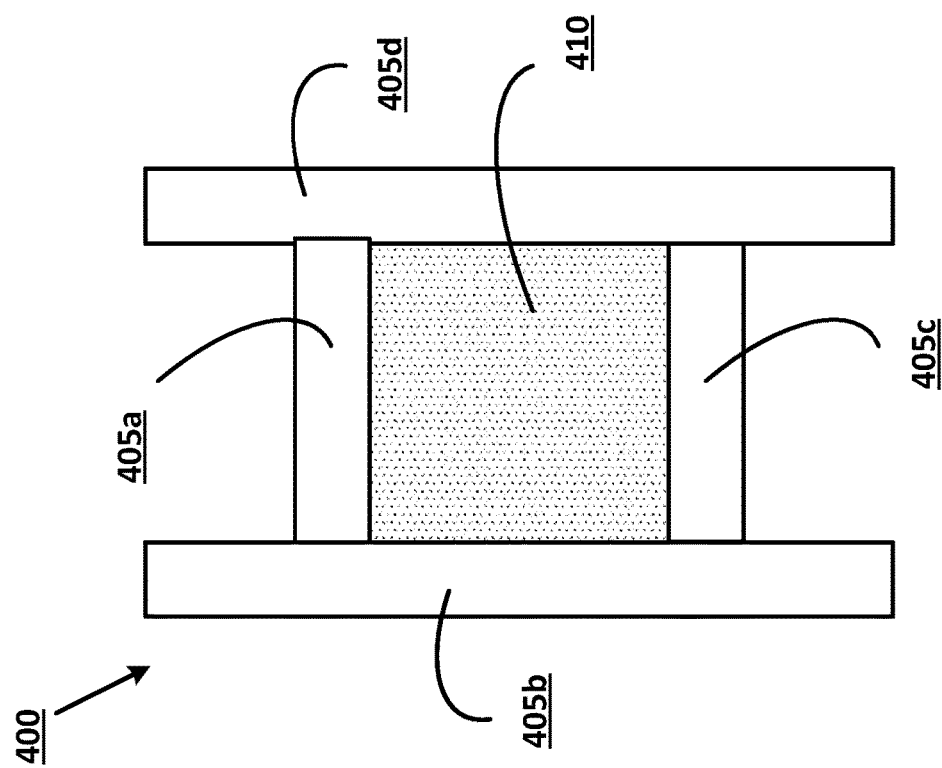
FIG. 4 depicts an alternative example of a die configuration with a plurality of I/O tiles, in accordance with various embodiments.
Figure 5:
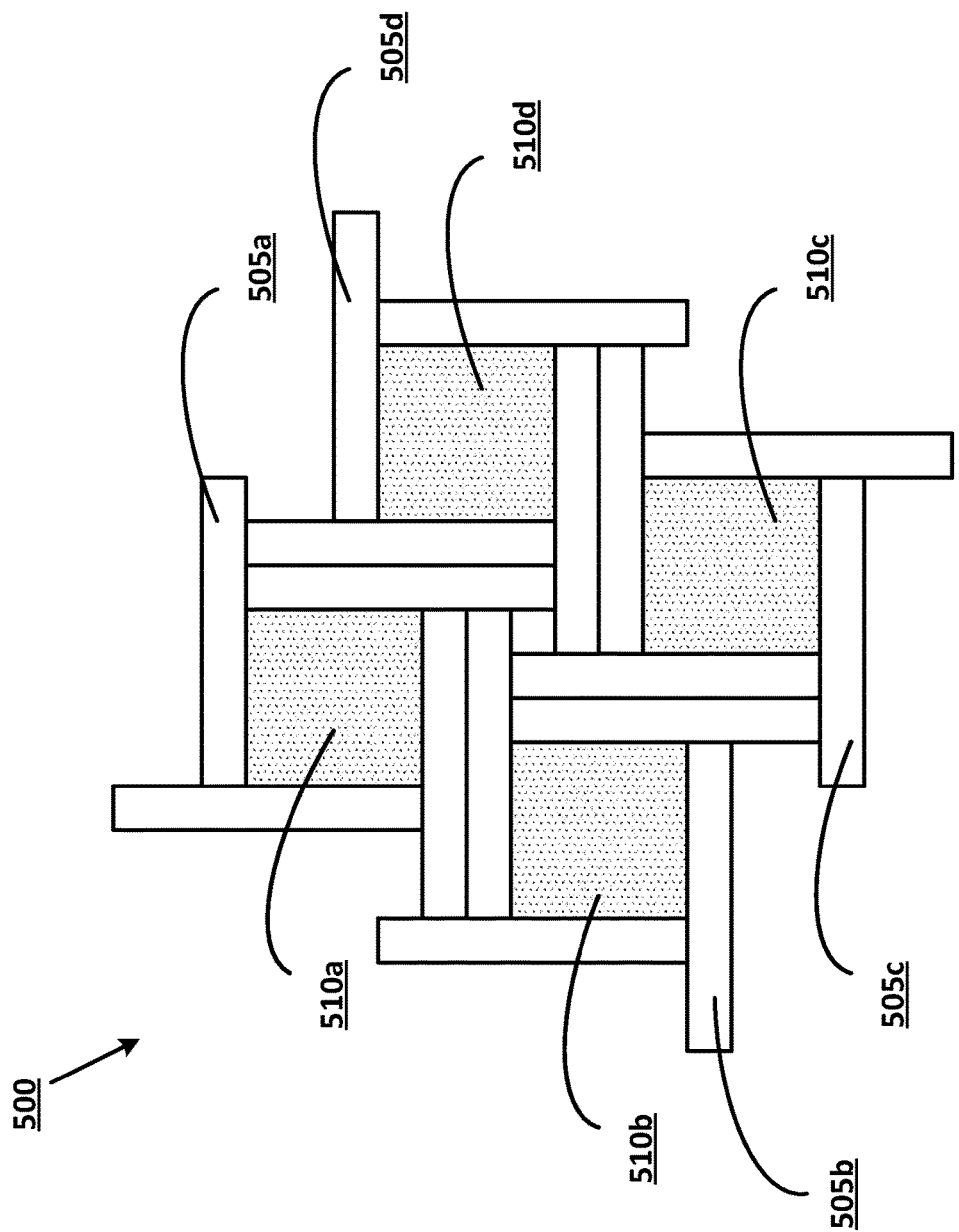
FIG. 5 depicts an alternative example of a die configuration with a plurality of I/O tiles, in accordance with various embodiments.
Figure 6:
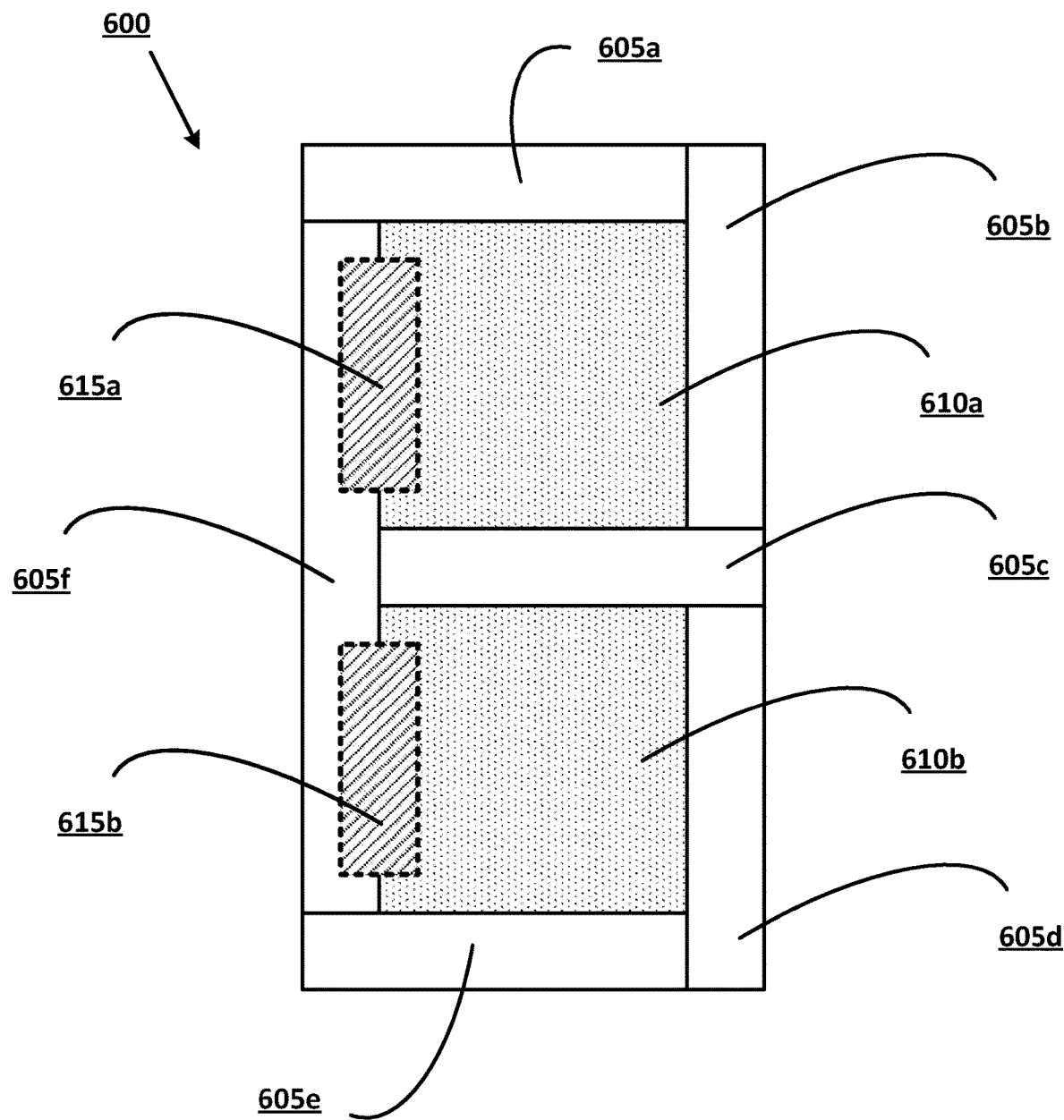
FIG. 6 depicts an alternative example of a die configuration with a plurality of I/O tiles, in accordance with various embodiments.

FIGS. 4-6 depict alternative examples of a die configuration with a plurality of I/O tiles, in accordance with various embodiments. Generally, the Figures are depicted as simplified examples of the configuration of a processor and an I/O tile. Not depicted in FIGS. 4-6 for the sake of lack of redundancy are a substrate such as substrate 220. Additionally, not depicted in FIGS. 4 and 5 for the sake of lack of redundancy are bridges such as bridges 215a-215d.

Specifically, FIG. 4 may include a die configuration 400 which may depict a processor 410 and I/O tiles 405a, 405b, 405c, and 405d (collectively referred to herein as "I/O tiles 405a-405d"). The processor 410 may be similar to, and share one or more characteristics with, processor 110. The I/O tiles 405a-405d may be generally similar to, and share one or more characteristics with, I/O tiles 105a-105d. However, as may be seen in FIG. 4, one or more of the I/O tiles 105a-105d may have a different size than another of the I/O tiles 105a-105d. Specifically, as may be seen, I/O tiles 405b and 405d may be larger than I/O tiles 405a and 405c. The specific size or configuration of respective ones of the I/O tiles of embodiments herein may be based on a variety of factors such as manufacturing considerations, whether several I/O breakouts need to be adjacent to one another, the specific configuration of a processor or the die substrate, or other factors.

In some embodiments, a die may include a plurality of processors, and the processors and I/O tiles may be patterned on the die. FIG. 5 depicts an example of such patterning. Specifically, FIG. 5 depicts a die configuration 500 that includes a plurality of processors 510a, 510b, 510c, and 510d (collectively referred to herein as "processors 510a-510d"). Respective ones of the processors 510a-510d may be similar to, and share one or more characteristics with, processor 110. The die configuration 500 may further include a plurality of I/O tiles 505a, 505b, 505c, 505d (collectively referred to herein as "I/O tiles 505a-505d"). The I/O tiles 505a-505d may be similar to, and share one or more characteristics with, I/O tiles 205a-205d. It will be understood that each of the I/O tiles in FIG. 5 may not be specifically enumerated for the sake of lack of clutter of the Figure.

In general, it may be seen that the die configuration 500 may be a repeating pattern of the die configuration 100b. It will be recognized that although the pattern is only repeated four times, in other embodiments the pattern may be repeated more or fewer times than depicted. In some embodiments, the pattern may involve repeating instance of different die configurations (e.g., the die configuration of FIG. 4 may be repeated with the die configuration 100b, etc.).

In some embodiments, an I/O tile may be communicatively coupled with a plurality of processors. Such an embodiment is shown in the die configuration 600 of FIG. 6. Specifically, FIG. 6 depicts an alternative example of a die configuration 600 with a plurality of I/O tiles, in accordance with various embodiments.

The die configuration 600 may include a plurality of processors 610a and 610b, which may be respectively similar to, and share one or more characteristics with, processor 110. The die configuration 600 may further include a plurality of I/O tiles 605a, 605b, 605c, 605d, 605e, and 605f (collectively "I/O tiles 605a-605f") which may be respectively similar to, and share one or more characteristics with, one or more of I/O tiles 105a-105d. The die configuration 600 may further include bridges 615a and 615b, which may be respectively similar to, and share one or more characteristics with, one of bridges 215a-215d.

As can be seen, bridges 615a and 615b may be respectively coupled with processors 610a and 610b. Additionally, bridges 615a and 615b may both be coupled with I/O tile 605f. In this way, I/O tile 605f may serve as an I/O breakout for both processors 610a and 610b.

In some embodiments, a plurality of processors may be present on a die, and the processors may be coupled with one another and share an I/O breakout. Such an embodiment is shown in the die configuration 1100 of FIG. 11. Specifically, FIG. 11 depicts an alternative example of a die configuration 1100 with a plurality of I/O tiles, in accordance with various embodiments.

The die configuration 1100 may include a plurality of processors 1110a, 1110b, and 1110c, which may be respectively similar to, and share one or more characteristics with, processor 110. The die configuration 1100 may further include a plurality of I/O tiles 1105a, 1105b, 1105c, 1105d, 1105e, 1105f, 1105g, and 1105h (collectively, "I/O tiles 1105a-1105h") which may be respectively similar to, and share one or more characteristics with, one or more of I/O tiles 105a-105d. The die configuration 1100 may further include bridges 1115a, 1115b, 1115c, and 1115d (collectively, "bridges 1115a-1115d") which may be respectively similar to, and share one or more characteristics with, one of bridges 215a-215d.

As can be seen, bridge 1115b may be communicatively coupled with both processor 1110b and 1110a. Similarly, bridge 1115c may be communicatively coupled with both processor 1110b and 1110c. Processor 1110a may be communicatively coupled with I/O tile 1105a by bridge 1115a. Similarly, processor 1110c may be communicatively coupled with I/O tile 1105e by bridge 1115d. In some embodiments, each of the bridges 1115a-1115d may be of the same size or type as each other, while in other embodiments one or more of the bridges 1115a-1115d may be of a different size or type than another of the bridges 1115a-1115d.

Figure 11:
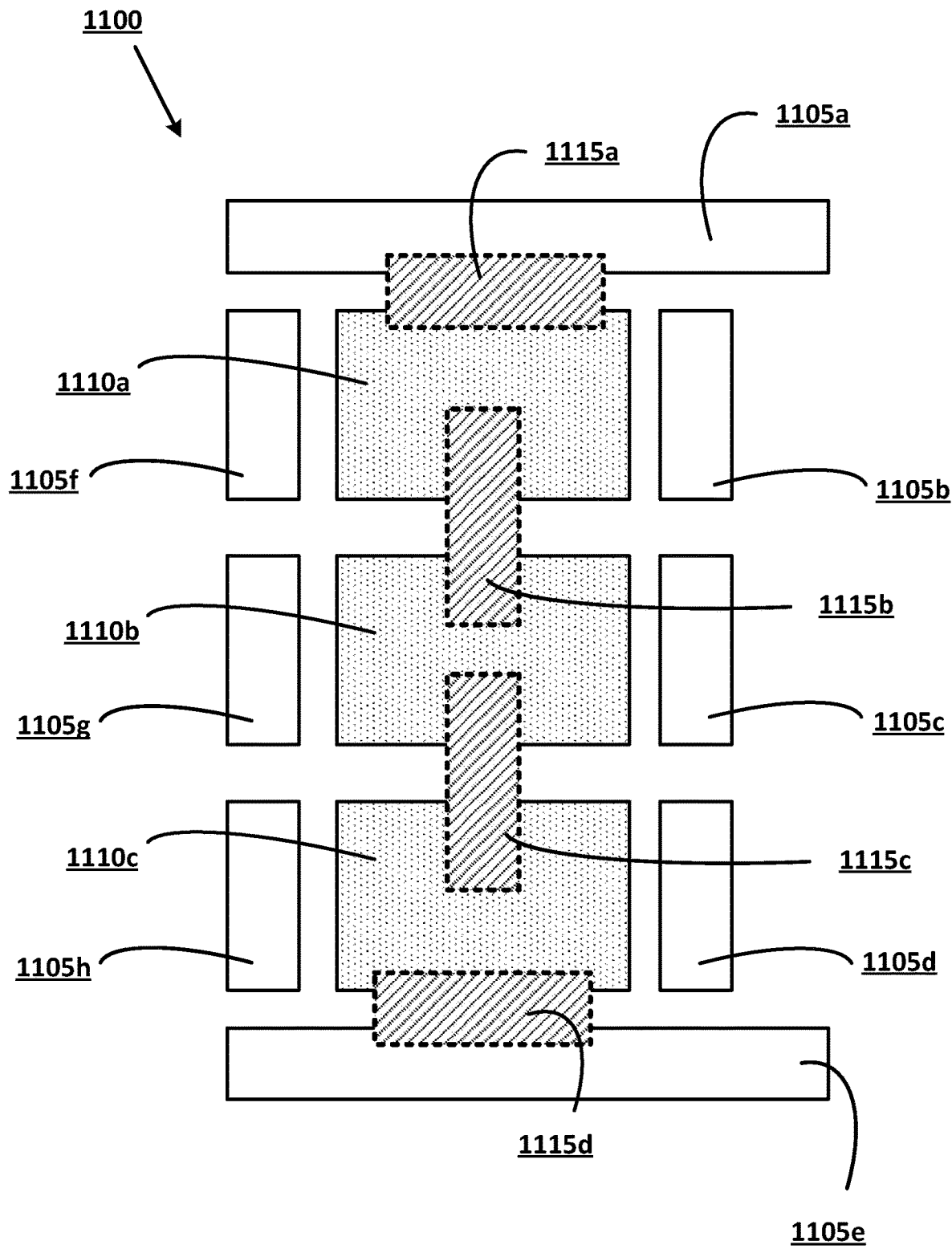
FIG. 11 depicts an alternative example of a die configuration with a plurality of I/O tiles, in accordance with various embodiments.

As shown in FIG. 11, processor 1110b may not be directly coupled with an I/O tile by a bridge. Rather, processor 1110b may be communicatively coupled with an I/O tile such as I/O tiles 1105a or 1105e through a communicative path that includes another processor and various bridges. For example, processor 1110b may be communicatively coupled with I/O tile 1105a through a communicative path that includes processor 1110a and bridges 1115a/1115b. Additionally or alternatively, processor 1110b may be communicatively coupled with I/O tile 1105e through a communicative path that includes processor 1110c and bridges 1115c/1115d. However, it will be recognized that in other embodiments processor 1110b may further be coupled with one of I/O tiles 1105a-1105h by a bridge such as one of bridges 1115a-1115d or some other type of bridge discussed herein.

It will be noted that in the die configurations 400/500/600 the various I/O tiles are depicted as directly adjacent to the various processors, as opposed to being spaced apart as shown in, for example, FIG. 1 or 2 or FIG. 11. It will be understood that the spacing of the I/O tiles from the processors in the various embodiments may be based on factors such as available die area, the specific elements or materials used, how the processor(s) are coupled with the I/O tiles, etc.

Additionally, it will be understood that the depicted configurations are intended as example embodiments to illustrate various concepts, and other embodiments may vary. For example, the specific size, shape, orientation, or number of elements may be different in different embodiments.

Aspects of some embodiments may be combined with one another. In some embodiments, certain elements that are depicted as identical may vary from one another. For example, in embodiments with a plurality of bridges (e.g., bridges 615a and 615b), the bridges may be of a different type, size, bandwidth, configuration, etc. than one another. Similarly, in embodiments with a plurality of processors (e.g., processors 610a and 610b), the processors may be of a different type or size than one another (e.g., one could be a logic while the other is a memory, or some other configuration). Other variations may be present in other embodiments.

Figure 7:
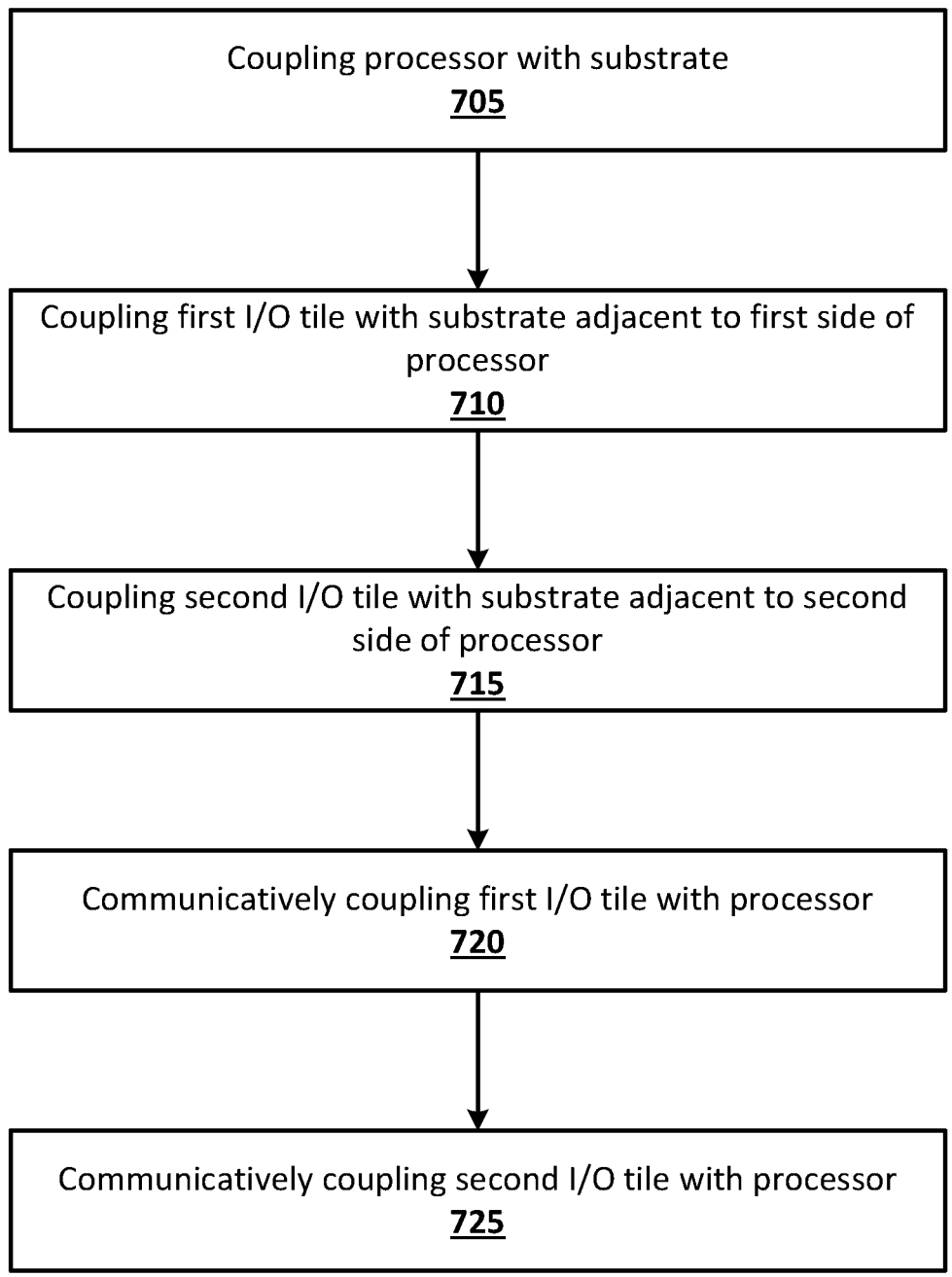
FIG. 7 depicts an example technique for the manufacture of a die with a plurality of I/O tiles, in accordance with various embodiments.

FIG. 7 depicts an example technique for the manufacture of a die with a plurality of I/O tiles, in accordance with various embodiments. The technique may be described herein with respect to elements of FIGS. 2 and 3, however it will be understood that the technique may be applicable, in whole or in part, with or without modification, to other embodiments of the present disclosure.

The technique may include coupling, at 705, a processor with a substrate. The substrate may be similar to, for example, substrate 220. The processor may be similar to, for example, processor 210. Coupling of the processor with the substrate may be done using interconnects such as a solder bump, a solder ball of a ball grid array (BGA), a pin of a pin grid array (PGA), or some other type of interconnect. In some embodiments, the interconnects may be coupled with a conductive element of the substrate or the processor such as a pad or some other conductive element.

The technique may further include coupling, at 710, a first I/O tile with the substrate. The I/O tile may be coupled with the substrate adjacent to a first side of the processor. The I/O tile may be similar to, for example, one of I/O tiles 205a-205d. Similarly to element 705, the I/O tile may be coupled with the substrate using an interconnect such as a BGA, a PGA, or some other type of interconnect.

The technique may further include coupling, at 715, a second I/O tile with the substrate adjacent to a second side of the processor. The second I/O tile may be similar to, for example, one of I/O tiles 205a-205d. Similarly to elements 705 or 710, the second I/O tile may be coupled with the substrate using an interconnect such as a BGA, a PGA, or some other type of interconnect.

The technique may further include communicatively coupling, at 720, the first I/O tile with the processor. Specifically, the I/O tile and the processor may be communicatively coupled by a bridge such as one of bridges 215a-215d which may be, for example, an EMIB, a conductive trace, a silicon bridge, or some other type of bridge.

The technique may further include coupling, at 725, the second I/O tile with the processor. Similarly to element 720, the second I/O tile and the processor may be communicatively coupled by a bridge such as one of bridges 215a-215d as described above.

It will be understood that the technique of FIG. 7 is intended as a highly simplified example technique, and other embodiments may include one or more variations from the technique described in FIG. 7. For example, in some embodiments certain elements may be performed in a different order than depicted, or concurrently with one another. For example, elements 710 and 715, or 720 and 725, may be performed concurrently. In some embodiments, certain elements (such as element 705) may not be present, whereas in other embodiments the technique may include additional elements. Other variations may be present in other embodiments.

Figure 8:
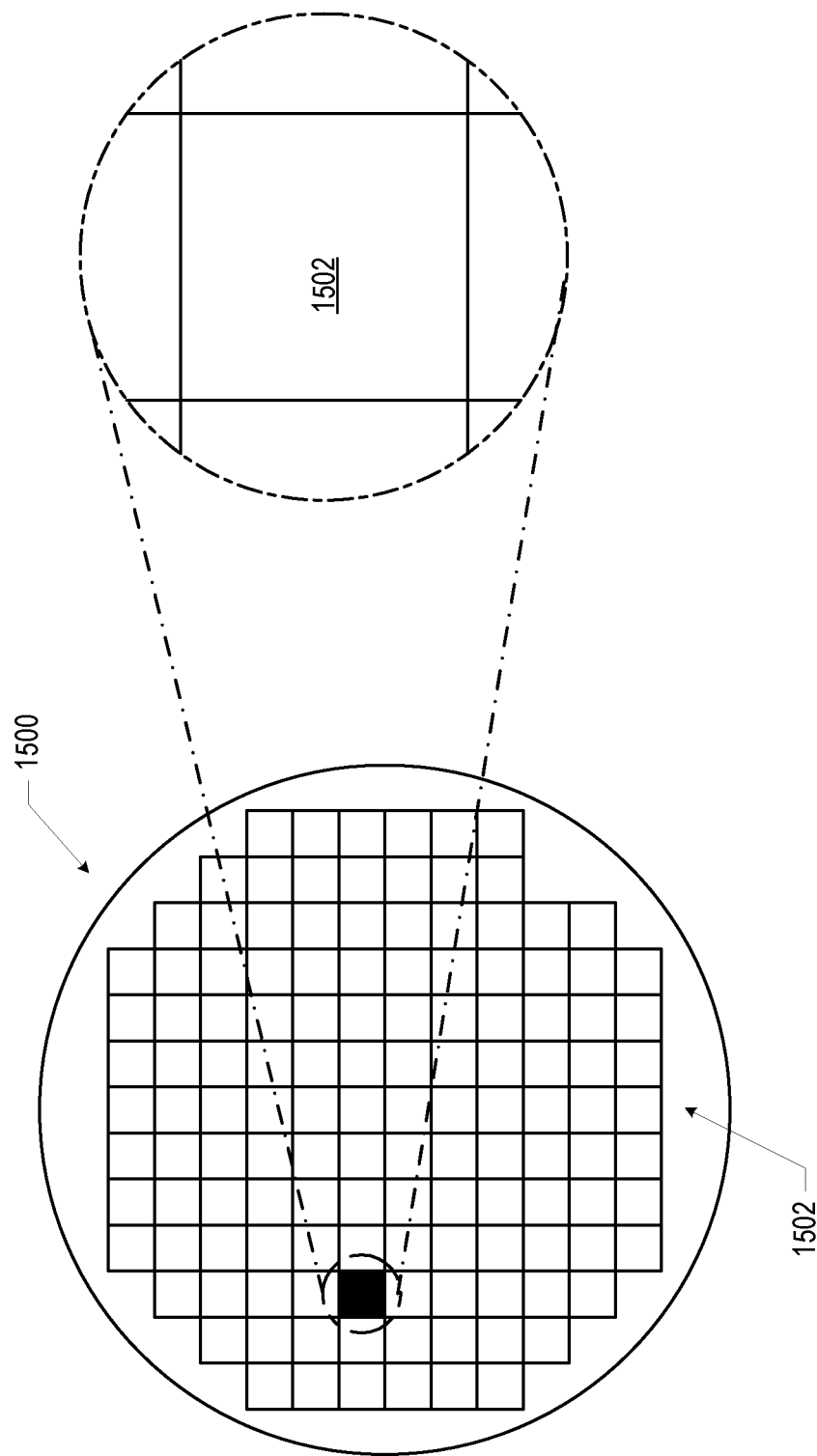
FIG. 8 is a top view of a wafer and dies that may include a plurality of I/O tiles, in accordance with various embodiments.

FIG. 8 is a top view of a wafer 1500 and dies 1502 that may include one or more I/O tiles, or may be included in an IC package including one or more dies with one or more I/O tiles in accordance with various embodiments. The wafer 1500 may be composed of semiconductor material and may include one or more dies 1502 having IC structures formed on a surface of the wafer 1500. Each of the dies 1502 may be a repeating unit of a semiconductor product that includes a suitable IC. After the fabrication of the semiconductor product is complete, the wafer 1500 may undergo a singulation process in which the dies 1502 are separated from one another to provide discrete "chips" of the semiconductor product. The die 1502 may include one or more I/O tiles, one or more transistors or supporting circuitry to route electrical signals to the transistors, or some other IC component. In some embodiments, the wafer 1500 or the die 1502 may include a memory device (e.g., a random-access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 10) or other logic that is configured to store information in the memory devices or execute instructions stored in the memory array.

Figure 9:
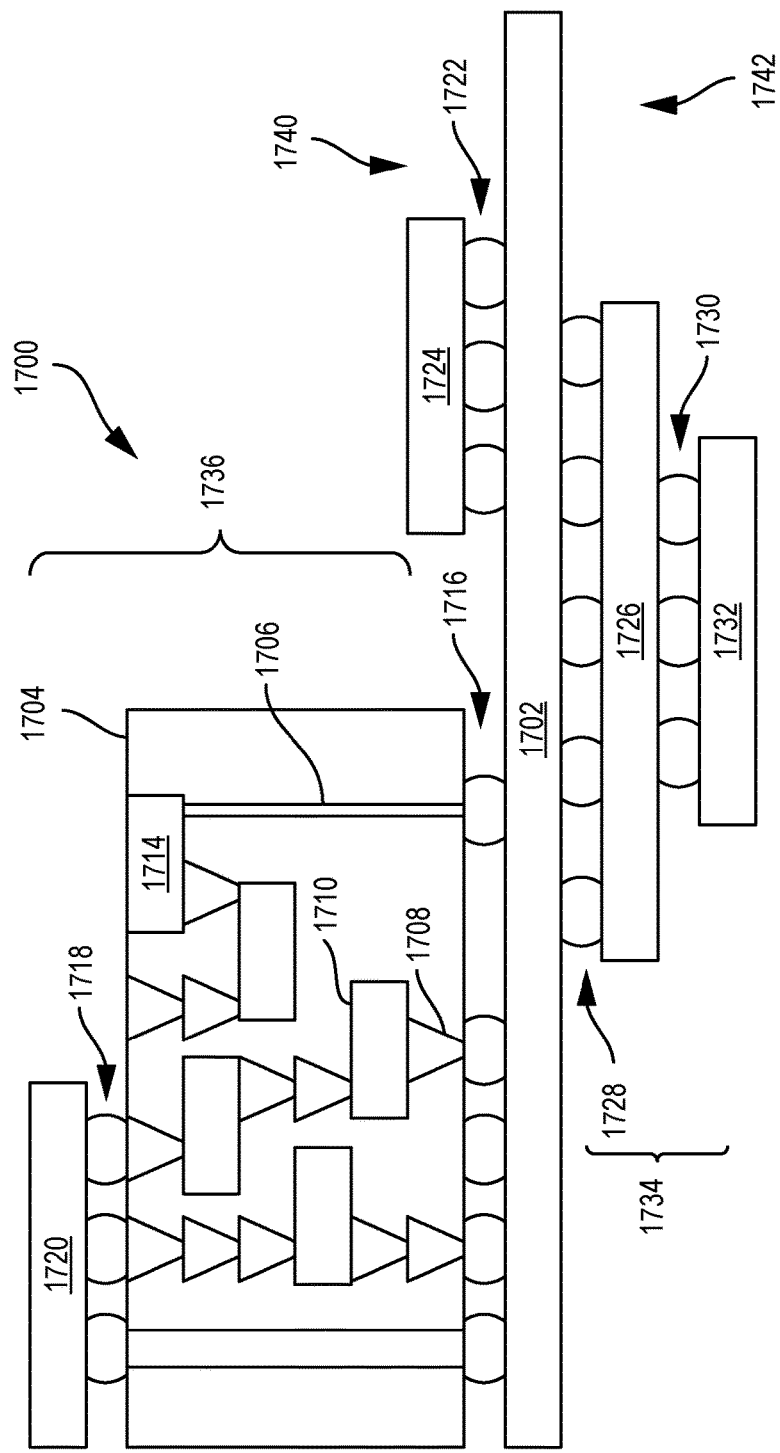
FIG. 9 is a side, cross-sectional view of an integrated circuit (IC) device assembly that may include a die with a plurality of I/O tiles, in accordance with various embodiments.

FIG. 9 is a side, cross-sectional view of an IC device assembly 1700 that may include one or more IC packages or other electronic components (e.g., a die) including one or more I/O tiles, in accordance with any of the embodiments disclosed herein. The IC device assembly 1700 includes a number of components disposed on a circuit board 1702 (which may be, e.g., a motherboard). The IC device assembly 1700 includes components disposed on a first face 1740 of the circuit board 1702 and an opposing second face 1742 of the circuit board 1702; generally, components may be disposed on one or both faces 1740 and 1742.

In some embodiments, the circuit board 1702 may be a printed circuit board (PCB) including multiple metal layers separated from one another by layers of dielectric material and interconnected by electrically conductive vias. Any one or more of the metal layers may be formed in a desired circuit pattern to route electrical signals (optionally in conjunction with other metal layers) between the components coupled to the circuit board 1702. In other embodiments, the circuit board 1702 may be a non-PCB substrate.

The IC device assembly 1700 illustrated in FIG. 9 includes a package-on-interposer structure 1736 coupled to the first face 1740 of the circuit board 1702 by coupling components 1716. The coupling components 1716 may electrically and mechanically couple the package-on-interposer structure 1736 to the circuit board 1702, and may include solder balls (as shown in FIG. 9), male and female portions of a socket, an adhesive, an underfill material, and/or any other suitable electrical and/or mechanical coupling structure.

The package-on-interposer structure 1736 may include an IC package 1720 coupled to a package interposer 1704 by coupling components 1718. The coupling components 1718 may take any suitable form for the application, such as the forms discussed above with reference to the coupling components 1716. Although a single IC package 1720 is shown in FIG. 9, multiple IC packages may be coupled to the package interposer 1704; indeed, additional interposers may be coupled to the package interposer 1704. The package interposer 1704 may provide an intervening substrate used to bridge the circuit board 1702 and the IC package 1720. The IC package 1720 may be or include, for example, a die (the die 1502 of FIG. 8), an IC device, or any other suitable component. Generally, the package interposer 1704 may spread a connection to a wider pitch or reroute a connection to a different connection. For example, the package interposer 1704 may couple the IC package 1720 (e.g., a die) to a set of BGA conductive contacts of the coupling components 1716 for coupling to the circuit board 1702. In the embodiment illustrated in FIG. 9, the IC package 1720 and the circuit board 1702 are attached to opposing sides of the package interposer 1704; in other embodiments, the IC package 1720 and the circuit board 1702 may be attached to a same side of the package interposer 1704. In some embodiments, three or more components may be interconnected by way of the package interposer 1704.

In some embodiments, the package interposer 1704 may be formed as a PCB, including multiple metal layers separated from one another by layers of dielectric material and interconnected by electrically conductive vias. In some embodiments, the package interposer 1704 may be formed of an epoxy resin, a fiberglass-reinforced epoxy resin, an epoxy resin with inorganic fillers, a ceramic material, or a polymer material such as polyimide. In some embodiments, the package interposer 1704 may be formed of alternate rigid or flexible materials that may include the same materials described above for use in a semiconductor substrate, such as silicon, germanium, and other group III-V and group IV materials. The package interposer 1704 may include metal lines 1710 and vias 1708, including but not limited to through-silicon vias (TSVs) 1706. The package interposer 1704 may further include embedded devices 1714, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the package interposer 1704. The package-on-interposer structure 1736 may take the form of any of the package-on-interposer structures known in the art. In some embodiments, the package interposer 1704 may include one or more dies with one or more I/O tiles.

The IC device assembly 1700 may include an IC package 1724 coupled to the first face 1740 of the circuit board 1702 by coupling components 1722. The coupling components 1722 may take the form of any of the embodiments discussed above with reference to the coupling components 1716, and the IC package 1724 may take the form of any of the embodiments discussed above with reference to the IC package 1720.

The IC device assembly 1700 illustrated in FIG. 9 includes a package-on-package structure 1734 coupled to the second face 1742 of the circuit board 1702 by coupling components 1728. The package-on-package structure 1734 may include an IC package 1726 and an IC package 1732 coupled together by coupling components 1730 such that the IC package 1726 is disposed between the circuit board 1702 and the IC package 1732. The coupling components 1728 and 1730 may take the form of any of the embodiments of the coupling components 1716 discussed above, and the IC packages 1726 and 1732 may take the form of any of the embodiments of the IC package 1720 discussed above. The package-on-package structure 1734 may be configured in accordance with any of the package-on-package structures known in the art.

Figure 10:
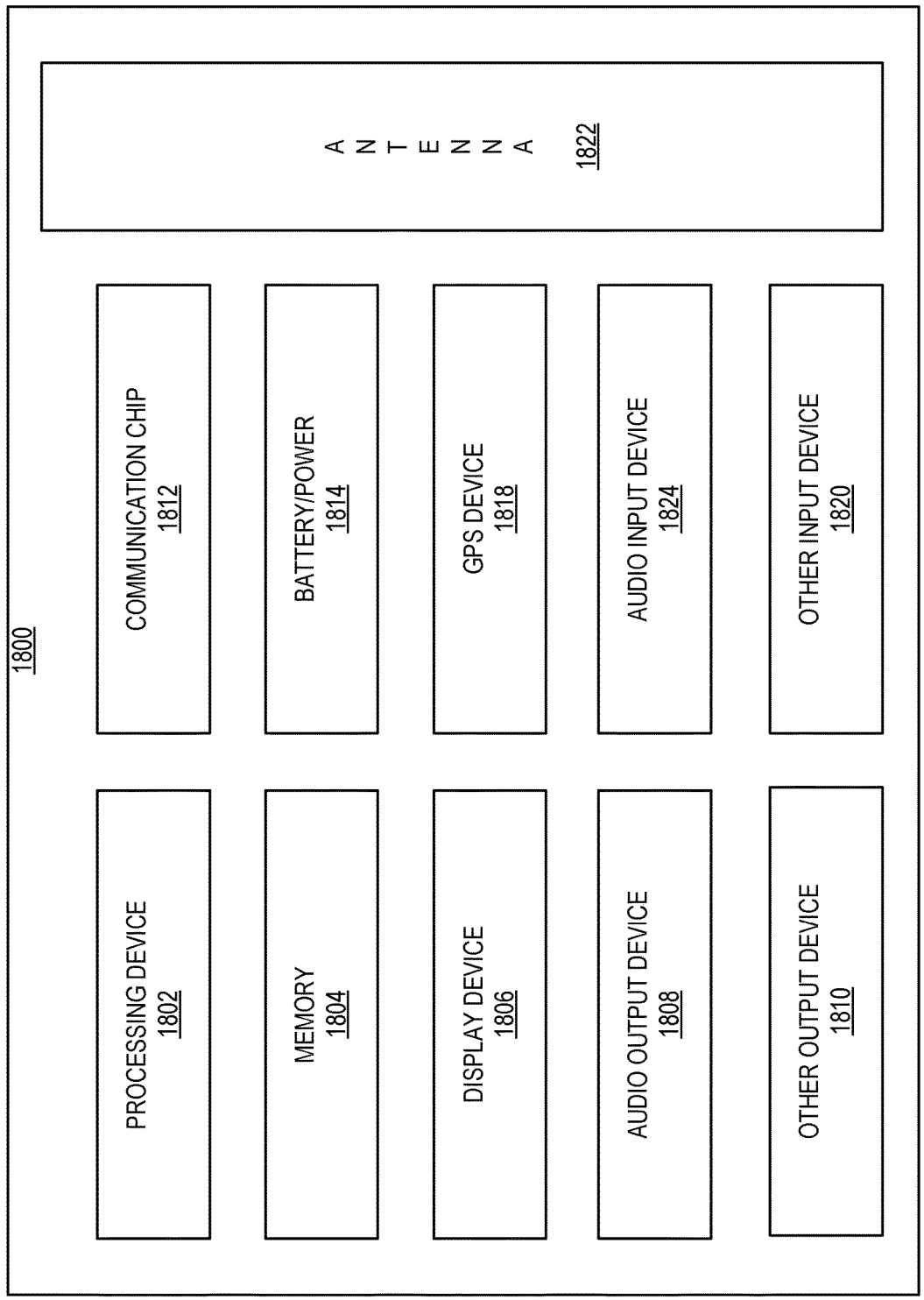
FIG. 10 is a block diagram of an example electrical device that may include a die with a plurality of I/O tiles, in accordance with various embodiments.

FIG. 10 is a block diagram of an example electrical device 1800 that may include one or more dies with one or more I/O tiles, in accordance with any of the embodiments disclosed herein. For example, any suitable ones of the components of the electrical device 1800 may include one or more of the IC device assemblies 1700, IC packages, IC devices, or dies 1502 disclosed herein. A number of components are illustrated in FIG. 10 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 10, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), application-specific integrated circuits (ASICs), CPUs, GPUs, cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic RAM (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic RAM (eDRAM) or spin transfer torque magnetic RAM (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

Examples of Various Embodiments

Example 1 includes a die comprising: a processor; a first input/output (I/O) tile adjacent to a first side of the processor, wherein the first I/O tile is communicatively coupled with the processor; and a second I/O tile adjacent to a second side of the processor, wherein the second I/O tile is communicatively coupled with the processor.

Example 2 includes the die of example 1, wherein the first I/O tile is to facilitate transmission of an electronic signal between the processor and another component of an electronic device to which the die is communicatively coupled.

Example 3 includes the die of example 1, wherein the first side and the second side of the processor are adjacent to one another.

Example 4 includes the die of example 1, wherein the first side and the second side of the processor are non-adjacent.

Example 5 includes the die of any of examples 1-4, wherein the processor is a processor core.

Example 6 includes the die of any of examples 1-4, wherein the first I/O tile has a same length as a length of the first side of the processor as measured in a direction parallel to the first side of the processor.

Example 7 includes the die of any of examples 1-4, wherein the first I/O tile has a greater length than a length of the first side of the processor as measured in a direction parallel to the first side of the processor.

Example 8 includes the die of any of examples 1-4, further comprising a second processor adjacent to the first I/O tile, wherein the first I/O tile is further communicatively coupled with the second processor.

Example 9 includes a die comprising: a substrate; a processor core coupled with the substrate; a first input/output (I/O) tile coupled with the substrate adjacent to a first side of the processor core, wherein the first I/O tile is communicatively coupled with the processor core by a first bridge; and a second I/O tile coupled with the substrate adjacent to a second side of the processor core, wherein the second I/O tile is communicatively coupled with the processor core by a second bridge.

Example 10 includes the die of example 9, wherein the first bridge is an EMIB.

Example 11 includes the die of example 10, wherein the EMIB is in the substrate.

Example 12 includes the die of example 9, further comprising a second processor core coupled with the substrate, wherein the second processor core is communicatively coupled with the first I/O tile by a third bridge.

Example 13 includes the die of any of examples 9-12, wherein the first I/O tile is to facilitate communication between the processor core and a component to which the die is communicatively coupled.

Example 14 includes the die of example 13, wherein the second I/O tile is to facilitate communication between the processor core and the component.

Example 15 includes an electronic device comprising: a PCB; and a die coupled with the PCB, wherein the die includes: a processor core; a first input/output (I/O) tile adjacent to a first side of the processor core, wherein the first I/O tile is communicatively coupled with the processor core and is to facilitate communication between the processor core and the PCB; and a second I/O tile adjacent to a second side of the processor core, wherein the second I/O tile is communicatively coupled with the processor core and is to facilitate communication between the processor core and the PCB.

Example 16 includes the electronic device of example 15, wherein the first I/O tile has a same length as a length of the first side of the processor core as measured in a direction parallel to the first side of the processor core.

Example 17 includes the electronic device of example 16, wherein the second I/O tile has a length greater than a length of the second side of the processor core as measured in a direction parallel to the second side of the processor core.

Example 18 includes the electronic device of any of examples 15-17, wherein the first I/O tile is communicatively coupled with the processor core by an EMIB.

Example 19 includes the electronic device of example 18, wherein the second I/O tile is communicatively coupled with the processor core by the EMIB.

Example 20 includes the electronic device of example 18, wherein the second I/O tile is communicatively coupled with the processor core by a second EMIB.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A microelectronic assembly, comprising:
a substrate;
a processor electrically coupled to the substrate, wherein the processor includes a first edge, a second edge, a third edge opposite the first edge, and a fourth edge opposite the second edge;
a first tile electrically coupled to the substrate adjacent to the second edge of the processor and communicatively coupled to the processor, wherein the first tile includes a fifth edge and a sixth edge opposite the fifth edge, and wherein the fifth edge of the first tile is aligned with the first edge of the processor and the sixth edge of the first tile extends beyond the third edge of the processor;
a second tile electrically coupled to the substrate adjacent to the third edge of the processor and communicatively coupled to the processor, wherein the second tile includes a seventh edge and an eighth edge opposite the seventh edge, and wherein the seventh edge of the second tile is aligned with the second edge of the processor and the eighth edge of the third tile extends beyond the fourth edge of the processor; and
a third tile electrically coupled to the substrate adjacent to the fourth edge of the processor and communicatively coupled to the processor, wherein the third tile includes a ninth edge and a tenth edge opposite the ninth edge, and wherein the ninth edge of the third tile is aligned with the third edge of the processor-and the tenth edge of the third tile extends beyond the first edge of the processor.

2. The microelectronic assembly of claim 1, further comprising:
a bridge, wherein the processor is communicatively coupled with the first tile by the bridge.

3. The microelectronic assembly of claim 2, wherein the bridge is at least partially embedded in the substrate.

4. The microelectronic assembly of claim 1, further comprising:
a first bridge, wherein the processor is communicatively coupled with the first tile by the first bridge;
a second bridge, wherein the processor is communicatively coupled with the second tile by the second bridge die; and
a third bridge, wherein the processor is communicatively coupled with the third tile by the third bridge.

5. The microelectronic assembly of claim 1, wherein the first tile, the second tile, and the third tile include an input/output (I/O) tile.

6. A microelectronic assembly, comprising:
a substrate;

a processor electrically coupled to the substrate, wherein the processor includes a first edge, a second edge, a third edge opposite the first edge, and a fourth edge opposite the second edge;
a first tile electrically coupled to the substrate adjacent to the second edge of the processor and communicatively coupled to the processor, wherein the first tile includes a fifth edge and a sixth edge opposite the fifth edge, and wherein the fifth edge of the first tile is aligned with the first edge of the processor and the sixth edge of the first tile extends beyond the third edge of the processor;
a second tile electrically coupled to the substrate adjacent to the third edge of the processor and communicatively coupled to the processor, wherein the second tile includes a seventh edge and an eighth edge opposite the seventh edge, and wherein the seventh edge of the second tile is aligned with the second edge of the processor and the eighth edge of the second tile extends beyond the fourth edge of the processor;
a third tile electrically coupled to the substrate adjacent to the fourth edge of the processor and communicatively coupled to the processor, wherein the third tile includes a ninth edge and a tenth edge opposite the ninth edge, and wherein the ninth edge of the third tile is aligned with the third edge of the processor and the tenth edge of the third tile extends beyond the first edge of the processor; and
a fourth tile electrically coupled to the substrate adjacent to the first edge of the processor and communicatively coupled to the processor, wherein the fourth tile includes an eleventh edge and a twelfth edge opposite the eleventh edge, and wherein the eleventh edge of the fourth tile is aligned with the fourth edge of the processor and the twelfth edge of the fourth tile extends beyond the second edge of the processor.

7. The microelectronic assembly of claim 6, further comprising:
a first bridge, wherein the processor is communicatively coupled with the first tile by the first bridge;
a second bridge, wherein the processor is communicatively coupled with the second tile by the second bridge;
a third bridge, wherein the processor is communicatively coupled with the third tile by the third bridge; and
a fourth bridge, wherein the processor is communicatively coupled with the fourth tile by the fourth bridge.

8. The microelectronic assembly of claim 6, wherein the first tile, the second tile, the fourth tile, and the fifth tile include an input/output (I/O) tile.

9. A microelectronic assembly, comprising:
a substrate;
a processor electrically coupled to the substrate, wherein the processor includes a first edge, a second edge, a third edge opposite the first edge, and a fourth edge opposite the second edge;
a first tile electrically coupled to the substrate at the second edge of the processor and communicatively coupled to the processor, wherein the first tile includes a fifth edge and a sixth edge opposite the fifth edge, and wherein the fifth edge of the first tile extends beyond the first edge of the processor and the sixth edge of the first tile extends beyond the third edge of the processor;
a second tile electrically coupled to the substrate at the fourth edge of the processor and communicatively coupled to the processor, wherein the second tile includes a seventh edge and an eighth edge opposite the seventh edge, and wherein the seventh edge of the second tile extends beyond the first edge of the processor and the eighth edge of the second tile extends beyond the third edge of the processor;
a third tile electrically coupled to the substrate at the first edge of the processor and communicatively coupled to the processor, wherein the third tile includes a ninth edge and a tenth edge opposite the ninth edge, and wherein the ninth edge of the third tile is aligned with the second edge of the processor and the tenth edge of the third tile is aligned with the fourth edge of the processor; and
a fourth tile electrically coupled to the substrate at the third edge of the processor and communicatively coupled to the processor, wherein the fourth tile includes an eleventh edge and a twelfth edge opposite the eleventh edge, and wherein the eleventh edge of the fourth tile is aligned with the second edge of the processor and the twelfth edge of the fourth tile is aligned with the fourth edge of the processor.

10. The microelectronic assembly of claim 9, further comprising:
a first bridge, wherein the processor is communicatively coupled with the first tile by the first bridge; and
a second bridge, wherein the processor is communicatively coupled with the second tile by the second bridge.

11. A microelectronic assembly, comprising:
a substrate;
a processor electrically coupled to the substrate, wherein the processor includes a first edge, a second edge, a third edge opposite the first edge, and a fourth edge opposite the second edge;
a first tile electrically coupled to the substrate adjacent to the second edge of the processor and communicatively coupled to the processor, wherein the first tile includes a fifth edge and a sixth edge opposite the fifth edge, and wherein the fifth edge of the first tile is aligned with the first edge of the processor and the sixth edge of the first tile extends beyond the third edge of the processor;
a second tile electrically coupled to the substrate adjacent to the third edge of the processor and communicatively coupled to the processor, wherein the second tile includes a seventh edge and an eighth edge opposite the seventh edge, and wherein the seventh edge of the second tile is aligned with the second edge of the processor and the eighth edge of the second tile extends beyond the fourth edge of the processor;
a third tile electrically coupled to the substrate adjacent to the fourth edge of the processor and communicatively coupled to the processor, wherein the third tile includes a ninth edge and a tenth edge opposite the ninth edge, and wherein the ninth edge of the third tile is aligned with the third edge of the processor and the tenth edge of the third tile extends beyond the first edge of the processor;
a fourth tile electrically coupled to the substrate adjacent to the first edge of the processor and communicatively coupled to the processor, wherein the fourth tile includes an eleventh edge and a twelfth edge opposite the eleventh edge, and wherein the eleventh edge of the fourth tile is aligned with the fourth edge of the processor and the twelfth edge of the fourth tile extends beyond the second edge of the processor; and
a second processor electrically coupled to the substrate adjacent to the first tile at a side opposite the processor and communicatively coupled to the fourth tile, wherein the second processor includes a thirteenth edge, a fourteenth edge, a fifteenth edge opposite the thirteenth edge, and a sixteenth edge opposite the fourteenth edge, and wherein the fourth tile extends along the thirteenth edge of the second processor and the twelfth edge of the fourth tile is aligned with the fourteenth edge of the second processor.

12. The microelectronic assembly of claim 11, further comprising:
   a first bridge, wherein the fourth tile is communicatively coupled with the processor by the first bridge; and
   a second bridge, wherein the fourth tile is communicatively coupled with the second processor by the second bridge.

13. The microelectronic assembly of claim 11, wherein the first tile, the second tile, the third tile, and the fourth tile include an input/output (I/O) tile.

* * * * *

UNITED STATES PATENT AND TRADEMARK OFFICE
CERTIFICATE OF CORRECTION

Page 1 of 1

PATENT NO. : 12,436,912 B2
APPLICATION NO. : 18/613256
DATED : October 7, 2025
INVENTOR(S) : Andrew Paul Collins et al.

It is certified that error appears in the above-identified patent and that said Letters Patent is hereby corrected as shown below:

In the Claims

In Column 14, Claim 1, Line 38, delete "third" and insert -- second --, therefor.

In Column 14, Claim 4, Line 60, delete "die; and" and insert -- ; and --, therefor.

In Column 15, Claim 8, Line 48, delete "the fourth tile, and the fifth tile" and insert -- the third tile, and the fourth tile --, therefor.

In Column 17, Claim 13, Lines 14-15, delete "wherein-the" and insert -- wherein the --, therefor.

Signed and Sealed this
Eighteenth Day of November, 2025

John A. Squires
*Director of the United States Patent and Trademark Office*